United States Patent
Shikha et al.

(10) Patent No.: US 10,713,235 B1
(45) Date of Patent: Jul. 14, 2020

(54) SYSTEMS AND METHODS FOR EVALUATING AND STORING DATA ITEMS

(71) Applicant: Veritas Technologies LLC, Mountain View, CA (US)

(72) Inventors: Deep Shikha, Pune (IN); Bhushan Pandit, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 184 days.

(21) Appl. No.: 15/492,674

(22) Filed: Apr. 20, 2017

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
CPC ......... G06F 17/30371; G06F 17/30312; G06F 17/3012; G06F 16/2365; G06F 16/22
See application file for complete search history.

(56) References Cited

U.S. PATENT DOCUMENTS

| | | | | |
|---|---|---|---|---|
| 7,707,178 B2 * | 4/2010 | Prahlad | ............. | G06F 16/24575 707/617 |
| 8,650,166 B1 * | 2/2014 | Cook | .................. | G06F 17/3012 707/694 |
| 8,930,496 B2 * | 1/2015 | Gokhale | ............. | G06F 11/1435 709/219 |
| 2007/0179995 A1 * | 8/2007 | Prahlad | ............... | G06F 11/1435 |
| 2008/0235611 A1 * | 9/2008 | Fraley | ................ | G06F 9/44505 715/772 |
| 2014/0324860 A1 * | 10/2014 | Rogers | .................. | G06F 3/0665 707/736 |
| 2014/0330785 A1 * | 11/2014 | Isherwood | .......... | G06F 11/1446 707/640 |
| 2016/0306827 A1 * | 10/2016 | Dos Santos | ............. | G06F 16/25 |

OTHER PUBLICATIONS

Information Fabric; http://www.b-eye-network.com/blogs/i_research/archives/2006/01/information_fab.php.

* cited by examiner

*Primary Examiner* — Robert W Beausoliel, Jr.
*Assistant Examiner* — Mohammad Solaiman Bhuyan
(74) *Attorney, Agent, or Firm* — FisherBroyles, LLP

(57) ABSTRACT

The disclosed computer-implemented method for evaluating and storing data items may include (i) receiving a data item to be evaluated and stored, (ii) evaluating the data item by comparing the data item with a set of rules used to determine properties of data items, (iii) storing, in connection with the data item, (a) at least one determined property of the data item and (b) contextual details about a state of at least one rule used to determine the property at a point in time at which the rule was used, and (iv) after the data item has been stored, performing an action on the data item based on the stored contextual details. Various other methods, systems, and computer-readable media are also disclosed.

20 Claims, 5 Drawing Sheets

SYSTEMS AND METHODS FOR EVALUATING AND STORING DATA ITEMS

BACKGROUND

Data analysis and data classifications systems may often generate and store metadata that indicates various properties and/or characteristics of data items (e.g., files, messages, documents, etc.). This metadata, which may be appended to or stored with data items, may enable users to search and/or organize large sets of data. For example, a search engine may identify files relevant to a user's search based on stored attributes of archived files. In addition, classifying or categorizing data items may enable a service (e.g., a messaging service or a security service) to appropriately handle and/or store the data items. As an example, an email client may sort received messages into appropriate folders or containers based on properties of the messages.

While traditional methods for classifying and storing data items may provide useful information about the characteristics of the data items, these methods may fail to provide a comprehensive history or evaluation of the metrics or rules by which data items are analyzed. Even if a conventional data classification system is capable of tracking changes in classification rules (e.g., by auditing or restoring previous rule sets), this process may be expensive and/or time-consuming. As such, valuable information regarding changes in both data items and classification rules may be lost. The instant disclosure, therefore, identifies and addresses a need for systems and methods for evaluating and storing data items.

SUMMARY

As will be described in greater detail below, the instant disclosure describes various systems and methods for evaluating and storing data items by (i) receiving a data item to be evaluated and stored, (ii) evaluating the data item by comparing the data item with a set of rules used to determine properties of data items, (iii) storing, in connection with the data item, (a) at least one determined property of the data item and (b) contextual details about a state of at least one rule used to determine the property at a point in time at which the rule was used, and (iv) after the data item has been stored, performing an action on the data item based on the stored contextual details.

In some examples, the method may include receiving the data item at a data storage system from an endpoint device that requests the data item be evaluated and stored. In other examples, receiving the data item may include (i) identifying the data item within a repository of data items maintained by a data storage system, (ii) determining that the data item has previously been evaluated, and (iii) detecting a trigger that prompts the data item to be re-evaluated. The trigger may include a change in the rule used to determine the property of the data item and/or a request from a user to re-evaluate the data item.

In some embodiments, storing the determined property and the contextual details about the state of the rule in connection with the data item may include updating an evaluation history of the data item that identifies additional contextual details about properties determined during a previous evaluation of the data item. Additionally or alternatively, storing this information may include appending a metadata tag to the data item that identifies the information and then storing the data item with the appended metadata tag within a data item repository.

In some examples, the contextual details about the state of the rule may include an identification of the rule, a version of the rule, and/or the point in time at which the rule was used. In some embodiments, the method may include recording additional contextual details about the rule, such as a number of additional data items that have been evaluated using the rule, a frequency with which the rule was used to evaluate the additional data item, a point in time at which the rule was created, and/or a subsequent point in time at which the rule was modified. In one example, the method may further include optimizing the rule based at least in part on the additional contextual details.

In some embodiments, performing the action on the data item may include enabling a user to retrieve the data item from within a data item repository. Additionally or alternatively, performing the action may include identifying changes in properties of the data item over time.

In one example, a system for evaluating and storing data items may include several modules stored in memory, including (i) a reception module that receives a data item to be evaluated and stored, (ii) an evaluation module that evaluates the data item by comparing the data item with a set of rules used to determine properties of data items, (iii) a storing module that stores, in connection with the data item, (a) at least one determined property of the data item and (b) contextual details about a state of at least one rule used to determine the property at a point in time at which the rule was used, and (iv) a performance module that performs, after the data item has been stored, an action on the data item based on the stored contextual details. In addition, the system may include at least one physical processor configured to execute the reception module, the evaluation module, the storing module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a data item to be evaluated and stored, (ii) evaluate the data item by comparing the data item with a set of rules used to determine properties of data items, (iii) store, in connection with the data item, (a) at least one determined property of the data item and (b) contextual details about a state of at least one rule used to determine the property at a point in time at which the rule was used, and (iv) after the data item has been stored, perform an action on the data item based on the stored contextual details.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

DETAILED DESCRIPTION OF EXAMPLE EMBODIMENTS

The present disclosure is generally directed to systems and methods for evaluating and storing data items. As will be explained in greater detail below, after identifying contextual and/or temporal details of a rule used to classify a data item (e.g., a version of the rule at the time the rule was used), the disclosed systems and methods may store this information with the data item in a data repository. As such, the systems and methods described herein may enable users to perform specific, nuanced searches based on properties of the rule (rather than searches based solely on properties of the data item). In addition, by tracking updates to rule sets and data item classifications, the disclosed systems and methods may detect significant changes in the effectiveness of data-classification rules.

Moreover, the systems and methods described herein may improve the functioning of an endpoint device by optimizing rules used to classify, store, and retrieve data items accessed by the endpoint device. These systems and methods may also improve the field of data classification by efficiently recording changes and updates to rules used to determine properties of data items.

Figure 1:
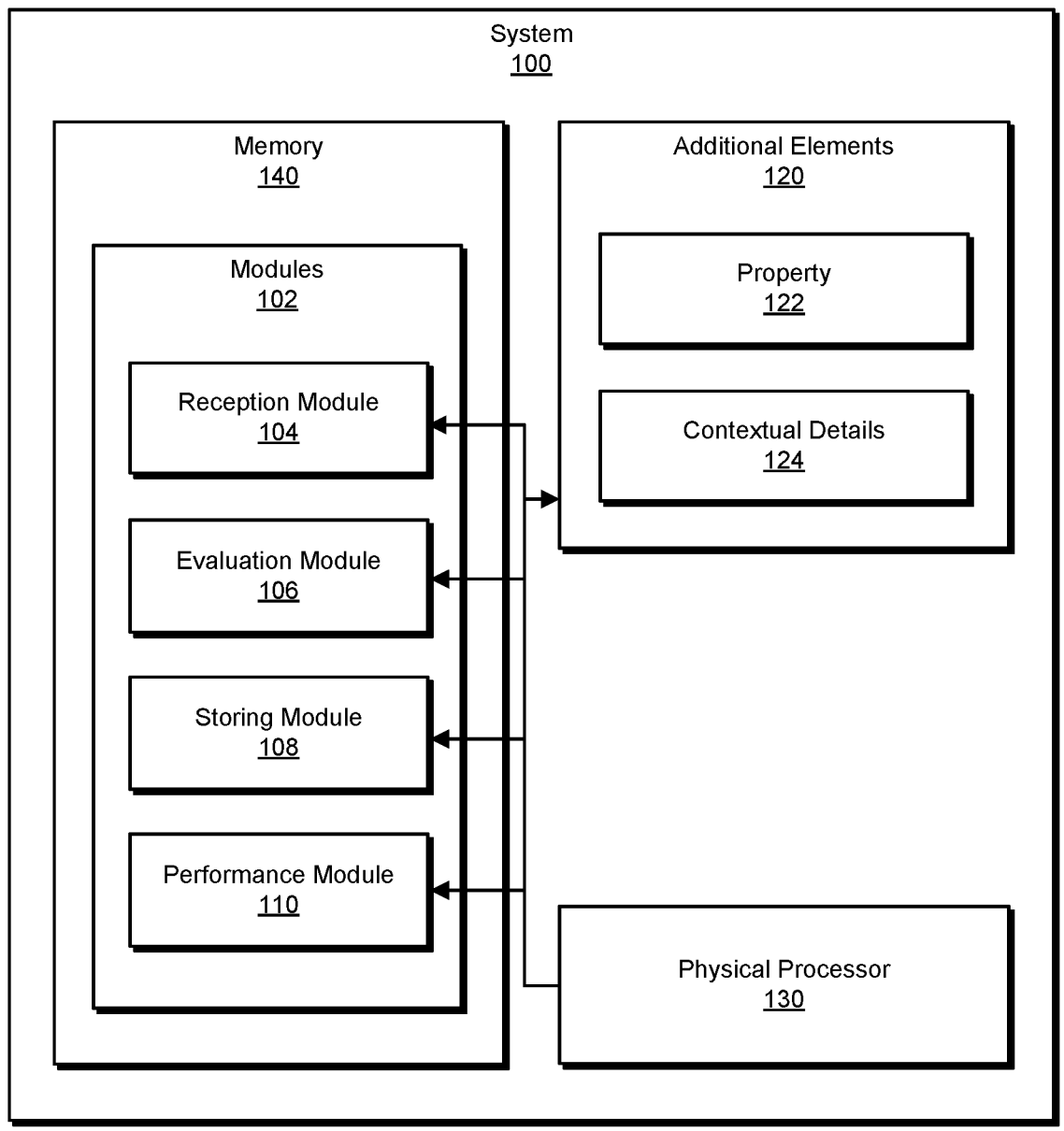
FIG. 1 is a block diagram of an example system for evaluating and storing data items.
Figure 2:
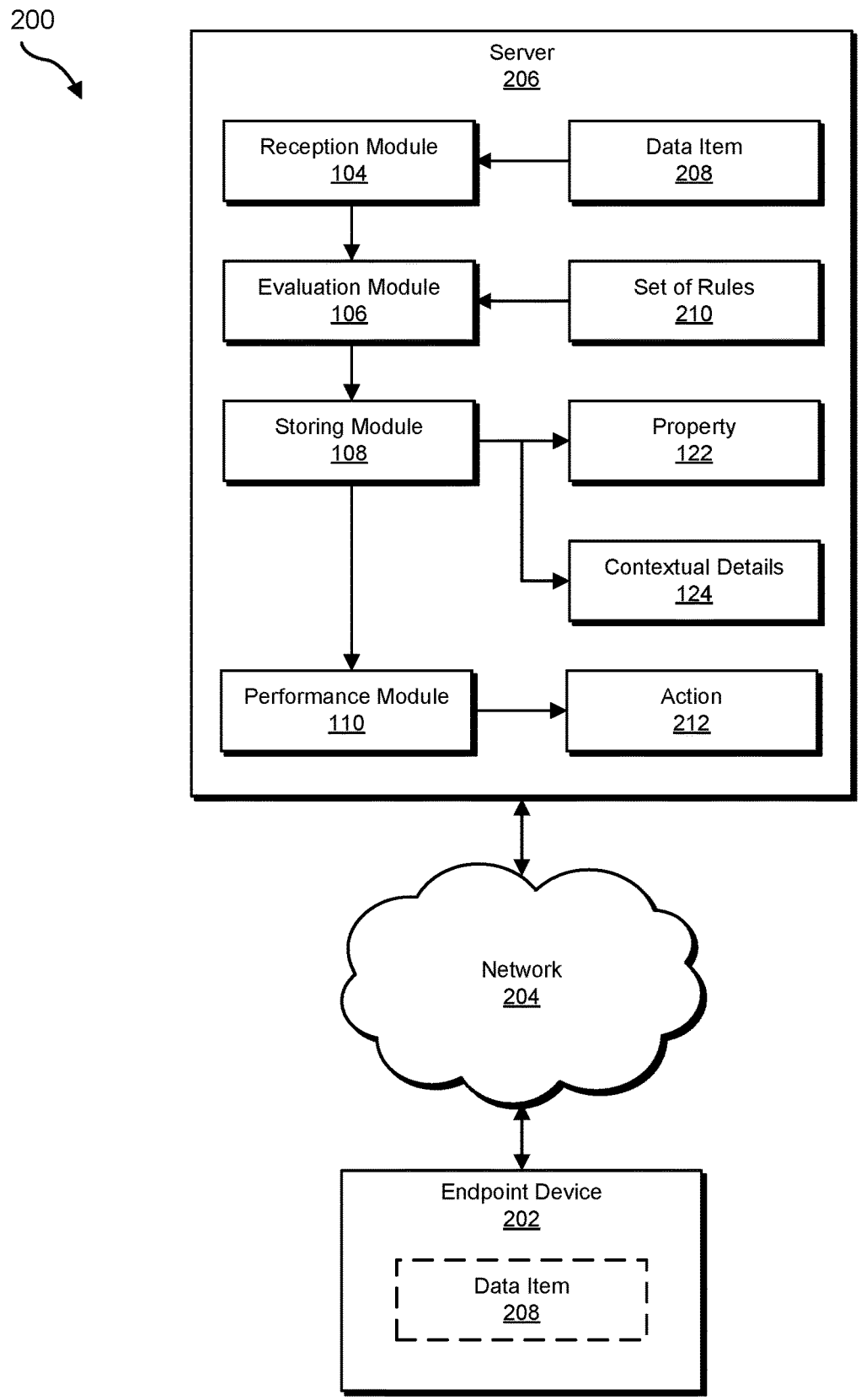
FIG. 2 is a block diagram of an additional example system for evaluating and storing data items.

The following will provide, with reference to FIGS. 1 and 2, detailed descriptions of example systems for evaluating and storing data items. Detailed descriptions of corresponding computer-implemented methods will also be provided in connection with FIGS. 3 and 5. In addition, detailed descriptions of example metadata appended to data items will be provided in connection with FIG. 4.

FIG. 1 is a block diagram of an example system 100 for evaluating and storing data items. As illustrated in this figure, example system 100 may include one or more modules 102 for performing one or more tasks. As will be explained in greater detail below, example system 100 may include a reception module 104 that receives a data item to be evaluated and stored. Example system 100 may also include an evaluation module 106 that evaluates the data item by comparing the data item with a set of rules used to determine properties of data items.

As will be explained in greater detail below, example system 100 may also include a storing module 108 that stores, in connection with the data item, (i) at least one determined property of the data item and (ii) contextual details about a state of at least one rule used to determine the property at a point in time at which the rule was used. Finally, example system 100 may include a performance module 110 that performs, after the data item has been stored, an action on the data item based on the stored contextual details. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., endpoint device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate evaluating and storing data items. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may include one or more additional elements 120. In one example, additional elements 120 may include a property 122, which generally represents any characteristic, label, categorization, or detail of a data item. Additional elements 120 may also include contextual details 124, which generally represent any information describing a rule or metric used to determine property 122. In particular, contextual details 124 may describe a state of the rule at a point in time at which the rule was used to determine property 122. For example, contextual details 124 may include a version or update history of the rule.

Example system 100 in FIG. 1 may be implemented in a variety of ways. For example, all or a portion of example system 100 may represent portions of example system 200 in FIG. 2. As shown in FIG. 2, system 200 may include an endpoint device 202 in communication with a server 206 via a network 204. In one example, all or a portion of the functionality of modules 102 may be performed by endpoint device 202, server 206, and/or any other suitable computing system. As will be described in greater detail below, one or more of modules 102 from FIG. 1 may, when executed by at least one processor of endpoint device 202, enable endpoint device 202 to evaluate and store data items.

For example, reception module 104 may cause server 206 to receive a data item 208 to be evaluated and stored. Evaluation module 106 may then cause server 206 to evaluate data item 208 by comparing data item 208 with a set of rules 210 that is used to determine properties of data items. Next, storing module 108 may cause server 206 to store, in connection with data item 208, property 122 of data item 208 and contextual details 124 about one or more rules within set of rules 210 used to determine property 122. After data item 208 has been stored, performance module 110 may cause server 206 to perform an action 212 on data item 208 based on contextual details 124.

Endpoint device 202 generally represents any type or form of computing device capable of reading computer-executable instructions. In one example, endpoint device 202 may represent an endpoint device running client-side backup or data-classification software. Additional examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of evaluating, storing, and/or retrieving data items. In one example, server 206 may represent a backend storage server that performs data-evaluation, data-classification, and/or data-storage services for one or more endpoint devices (such as endpoint device 202). Additional examples of server 206 include, without limitation, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between endpoint device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
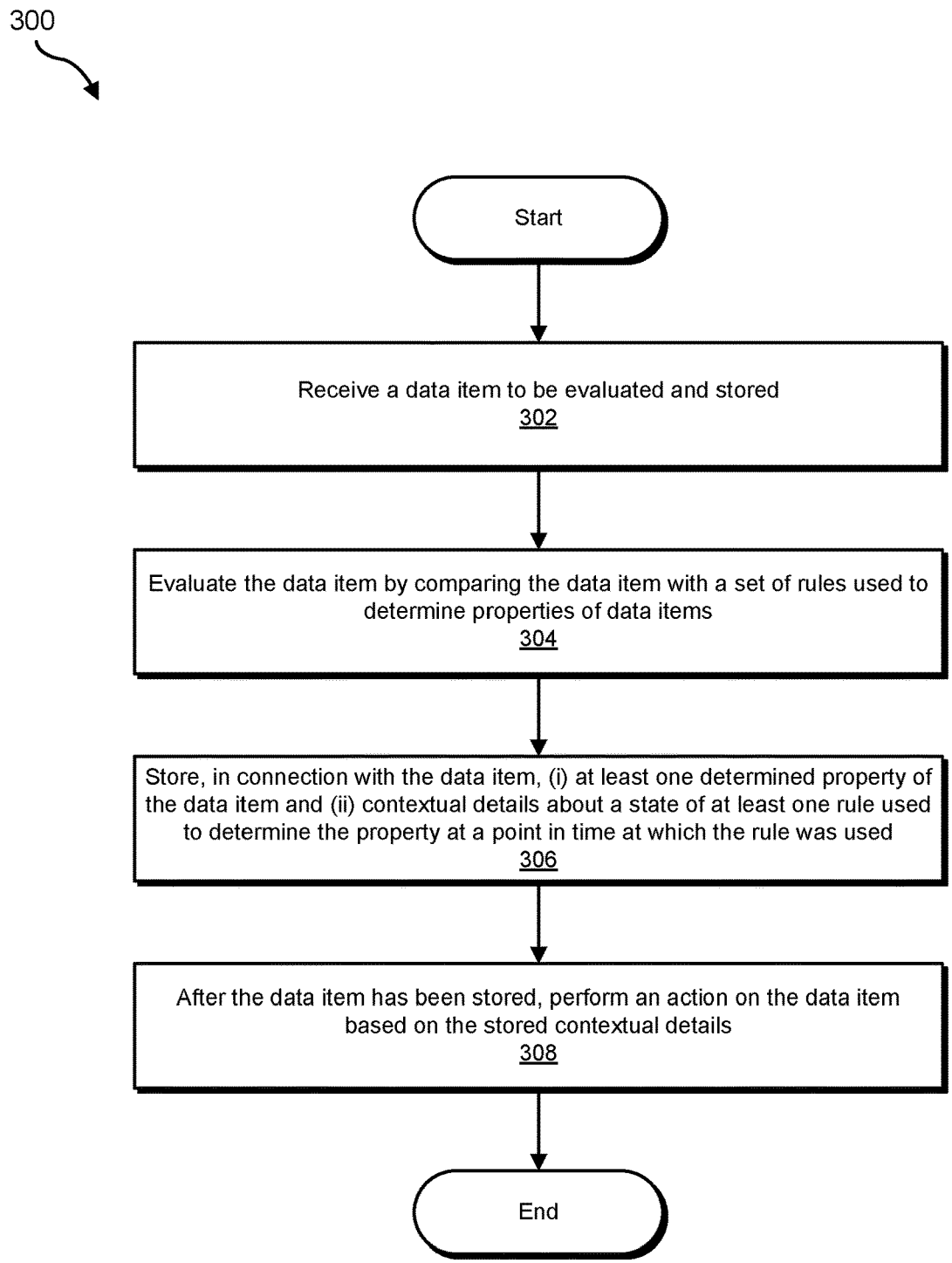
FIG. 3 is a flow diagram of an example method for evaluating and storing data items.

FIG. 3 is a flow diagram of an example computer-implemented method 300 for evaluating and storing data items. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a data item to be evaluated and stored. For example, reception module 104 may, as part of server 206 in FIG. 2, receive data item 208.

The term "data item," as used herein, generally refers to any type of formatted unit of data. In some embodiments, a data item may represent a portion of information that a user and/or endpoint device may wish to evaluate, store, and/or retrieve at a future point in time. Examples of data items include, within limitation, files, documents, applications, portions of executable code, databases, electronic messages, websites, combinations of one or more of the same, and/or variations of one or more of the same.

The systems described herein may receive a data item in a variety of ways. In some examples, reception module 104 may receive a data item from an endpoint device. For example, the endpoint device may send the data item to a data-storage and/or data-evaluation system maintained by the disclosed systems. In one embodiment, this system may be located on a backend server that the endpoint device may communicate with via a network. In another embodiment, this system may be located on the endpoint device (e.g., the disclosed systems may operate as part of a service running on the endpoint device). Reception module 104 may receive a data item from an endpoint device in a variety of contexts. For example, a user may forward a data item to reception module 104 with a request for the data item to be evaluated and stored. Alternatively, a client-side agent managed by the disclosed systems may identify a data item on the endpoint device. For example, the agent may monitor data items the endpoint device attempts to access or distribute and send all or a portion of detected data items to reception module 104.

As an example, the disclosed systems may operate as part of an email-archiving service that classifies, sorts, and stores electronic messages for one or more messaging accounts. In this example, reception module 104 may receive or identify emails handled by email clients running on endpoint devices. In another example, the disclosed systems may operate as part of a security service that classifies files as malicious or legitimate. In this example, reception module 104 may receive or identify suspicious and/or unverified files that endpoint devices have attempted to access.

In other examples, reception module 104 may identify a data item that has previously been evaluated and stored by the disclosed systems. As will be explained in greater detail below, after receiving and evaluating a data item, the data item may be stored in a data repository (e.g., a database or storage server). In some examples, reception module 104 may determine, after a data item has been stored, that the data item should be re-evaluated. For example, reception module 104 may determine that a user or endpoint device has requested new or additional information about the data item. In another example, reception module 104 may determine that a predetermined amount of time (e.g., 1 week, 2 months, etc.) has passed since the data item was initially evaluated. Additionally or alternatively, reception module 104 may determine that a rule used to perform the initial evaluation of the data item has been changed or updated (e.g., a new version of the rule has been created). In these examples, reception module 104 may retrieve the data item from within a data repository such that an additional evaluation of the data item may be performed.

Returning to FIG. 3, at step 304 one or more of the systems described herein may evaluate the data item by comparing the data item with a set of rules used to determine properties of data items. For example, evaluation module 106 may, as part of server 206 in FIG. 2, evaluate data item 208 by comparing data item 208 with set of rules 210.

The term "rule," as used herein, generally refers to any type or form of metric, analysis technique, or test capable of identifying one or more properties of a data item. In some examples, a rule may contain criteria or conditions that identify or correspond to one or more properties. In these examples, evaluation module 106 may evaluate a data item by comparing content or characteristics of the data item with the criteria listed in the rule. In the event that the content of the data item matches all or a portion of the criteria within the rule, evaluation module 106 may determine that the data item has or is associated with the property described by the rule.

The term "property," as used herein, generally refers to any characteristic, quality, type, categorization, or label that describes a data item. A property may indicate a group to which a data item belongs, an assessment of the benefits or consequences of accessing the data item, an importance or relevance of the data item, and/or any additional attribute or description of the data item. In one embodiment, two or more properties may be mutually exclusive with one another (i.e., if a data item has a particular property, it may not have one or more other properties). For example, a file may be classified as "malicious" or may be classified as "legitimate," but may not be classified as both. In other embodiments, multiple properties may describe a single data item. As an example, an email may be simultaneously classified as "work-related" and "urgent."

After reception module 104 identifies a data item to be evaluated, evaluation module 106 may evaluate the data item based on one or more rules. In one example, evaluation module 106 may compare a data item with multiple rules that correspond to various properties to determine each property associated with the data item. In addition, evaluation module 106 may evaluate a data item using a most recent or current version of a rule. For example, a data evaluation system may periodically update or modify rules to reflect newly-discovered information that may more precisely or efficiently characterize data items. These updates may be stored or indicated as different versions of rules. Accordingly, evaluation module 106 may most accurately determine the properties of a data item by using the latest version of a rule set.

Returning to FIG. 3, at step 306 one or more of the systems described herein may store, in connection with the data item, (i) at least one determined property of the data item and (ii) contextual details about a state of at least one rule used to determine the property at a point in time at which the rule was used. For example, storing module 108 may, as part of server 206 in FIG. 2, store property 122 and contextual details 124 in connection with data item 208.

The term "state of a rule," as used herein, generally refers to any mode, description, condition, or quality of a rule at a certain point in time. In one example, the state of a rule may include a name or identification of the rule. For example, a rule may be associated with a number, tag, or title that distinguishes the rule from other rules within a rule set. Additionally or alternatively, the state of a rule may indicate a version of the rule.

The systems described herein may store a variety of information about an evaluated data item. In some examples, storing module 108 may store each property of a data item that was identified by evaluation module 106. In addition, storing module 108 may store information about all or a portion of the rules that were used to determine the properties. In particular, storing module 108 may store the state of a rule (e.g., the name and/or version of the rule). Storing module 108 may also store relevant contextual or temporal details about the rule, such as a point in time at which the rule was created, a point in time at which the rule was updated (e.g., when the current version of the rule was generated), and/or a point in time at which the rule was used (e.g., the current date or time).

In some embodiments, storing module 108 may store, in connection with a data item, information that indicates the data item's history of evaluation. For example, as described above, the disclosed systems may re-evaluate a data item after the data item has been initially evaluated and stored (e.g., in response to a detected trigger). In these examples, storing module 108 may indicate that the current evaluation of the data item is not the first evaluation. For example, storing module 108 may add information about the current evaluation to information stored during a previous evaluation. By logging the evaluation history of a data item, the disclosed systems may more accurately and comprehensively analyze both the data item and the rules used to determine properties of the data item.

Storing module 108 may store information about an evaluated data item in any manner such that the information may be associated with the data item when the data item is retrieved from within a storage system. In one embodiment, storing module 108 may add or insert the information into a file or structure that contains the data item. Specifically, storing module 108 may append a metadata tag to the data item that contains both the data item's properties and contextual information about rules used to determine the properties.

Figure 4:
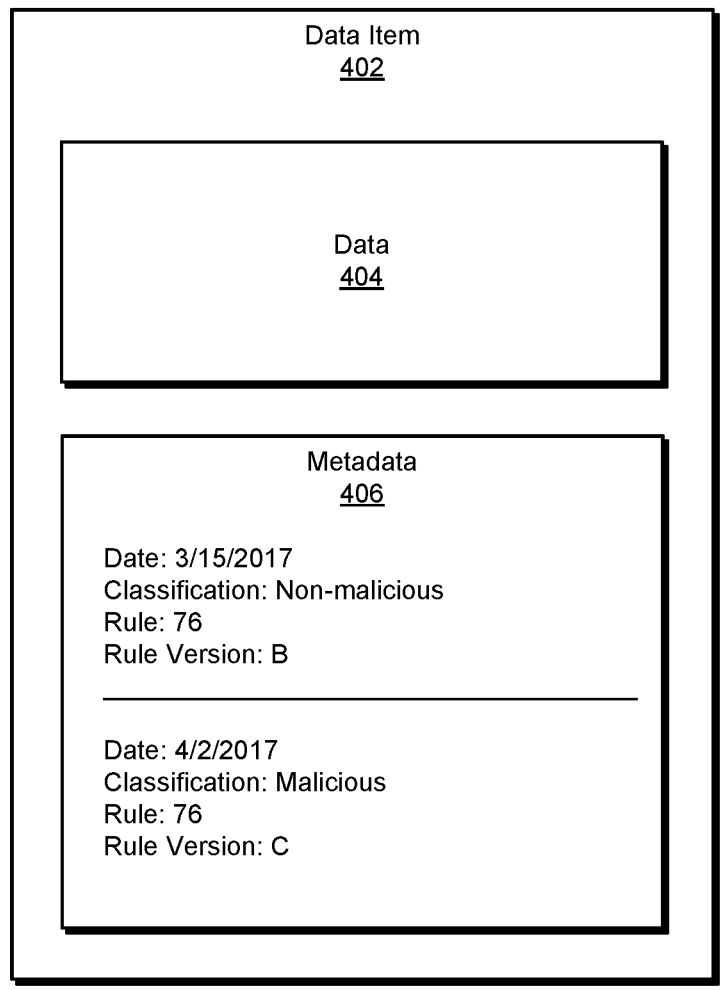
FIG. 4 is an illustration of example metadata appended to a data item.

FIG. 4 illustrates an example of such a metadata tag. In this example, evaluation module 106 may determine properties of a data item 402 based on an analysis of data 404 within data item 402. Storing module 108 may then indicate information about these properties by appending metadata 406 to data item 402. As shown in FIG. 4, metadata 406 may indicate that data item 402 was first evaluated on Mar. 15, 2017. Metadata 406 may also indicate that this evaluation resulted in a classification of data item 402 as non-malicious. In addition, metadata 406 may indicate that this classification was determined using version "B" of rule "76."

As also shown in FIG. 4, metadata 406 may indicate that data item 402 was evaluated a second time. In one example, this re-evaluation may have been triggered by an update to the rule used to determine the initial classification of data item 402 (e.g., an update of rule 76 from version "B" to version "C"). Metadata 406 may indicate that the re-evaluation occurred on Apr. 2, 2017 and that the update to rule 76 changed the classification of data item 402 from non-malicious to malicious.

Storing module 108 may store determined properties and contextual details about rules in any additional or alternative manner. In one example, storing module 108 may store this information in a separate file that points to or references a data item. This file may be searched for and/or retrieved in the same manner and at the same time as the data item.

After appending or associating information about determined properties of a data item with the data item, storing module 108 may store the data item within a data repository. For example, storing module 108 may store the data item within a database that enables a user or endpoint device to search for and retrieve the data item at a later point in time. In one embodiment, this database may index the data item such that the data item may be identified and retrieved based on metadata associated with the data item. In addition, the database may store data items using any type or form of storage medium, such as cloud-based storage, virtual storage, a fast-access cache, and/or a hard disk.

Storing module 108 may collect and store a variety of additional information about rules used to determine properties of data items. In one example, storing module 108 may record the history of a rule's creation and/or updates. Specifically, storing module 108 may record the point in time at which a rule is created, as well as each subsequent point in time at which the rule is updated. Storing module 108 may also store copies of each version of a rule. For example, instead of over-writing an existing or previous version of a rule after a new version has been generated, storing module 108 may add the new version to a database that identifies past versions of rules.

Additionally or alternatively, storing module 108 may store information about the overall use and/or effectiveness of a rule within a data evaluation system. For example, storing module 108 may track how many data items (e.g., a number or percentage of data items) handled by the data evaluation system have been classified or characterized using the rule. Similarly, storing module 108 may determine a frequency (e.g., once a day, twice a week, etc.) with which the rule is used to determine properties of data items. Such information may be stored in connection with a rule or a rule set, rather than in connection with a data item.

Returning to FIG. 3, at step 308 one or more of the systems described herein may perform, after the data item has been stored, an action on the data item based on the stored contextual details. For example, performance module 110 may, as part of server 206 in FIG. 2, perform an action on data item 208 based on contextual details 124 after data item 208 has been stored within server 206.

The systems described herein may perform an action on a data item in a variety of ways. As previously mentioned, storing module 108 may store a data item within a data repository such that the data item may later be retrieved. In some examples, performance module 110 may enable a user or endpoint device to search for a data item stored within a data repository based on properties of the data item and/or contextual details about rules used to determine the properties. For example, performance module 110 may receive a search request from a user (e.g., via a user interface of a data storage system). This search request may specify one or more properties of a data item and/or characteristics of a rule. For example, a user may request to retrieve emails that have been classified as "travel-related." In another example, a user may request to retrieve malicious files that have been classified using a certain version of a rule. As an additional example, a user may request to retrieve documents that were classified and archived on a certain date.

To fulfill such requests, performance module 110 may analyze or sort data items based on both properties of the data items and contextual details about rules stored in connection with the data items. For example, performance module 110 may identify data items that match a user's query based on any or all of the information within metadata tags appended to the data items. Traditional data storage systems that simply index data items based on characteristics of the data items (and do not store contextual details about rules used to analyze the data items) may be unable to provide users with the comprehensive and detailed search results provided by the disclosed systems.

Storing contextual details about rules used to determine properties of data items may additionally enable a user or service to identify changes in properties of the data items over time. For example, based on multiple metadata tags appended to a data item, performance module 110 may determine that the classification of a data item has been changed or reversed (e.g., as in the example illustrated in FIG. 4). The disclosed systems may use changes in a property of a data item to update or optimize procedures for handling related or similar data items. For example, performance module 110 may determine that an old version of a rule is obsolete or ineffective in the event that a new version of the rule results in a different classification. In addition, performance module 110 may determine that a rule is ineffective in the event that properties determined by the rule are frequently changed or over-turned by other rules. In response to detecting an ineffective rule (or version of a rule), performance module 110 may retire the rule from active use, delete the rule, recommend adjustments to the rule that may improve the effectiveness of the rule, and/or perform any additional action to improve the performance of a data-evaluation system.

In some embodiments, performance module 110 may optimize a rule based on collected information that describes the rule's update history and/or use within a data evaluation system. This information (described above in connection with step 306), may indicate whether a rule is capable of accurately determining properties of data items. For example, performance module 110 may determine that a rule that has classified a small number of data items may be less effective than another rule that has classified a larger number of data items. In another example, performance module 110 may determine that one or more rules are redundant or unnecessary in the event that multiple rules result in the same classification. Accordingly, performance module 110 may consolidate and/or remove the rules.

Figure 5:
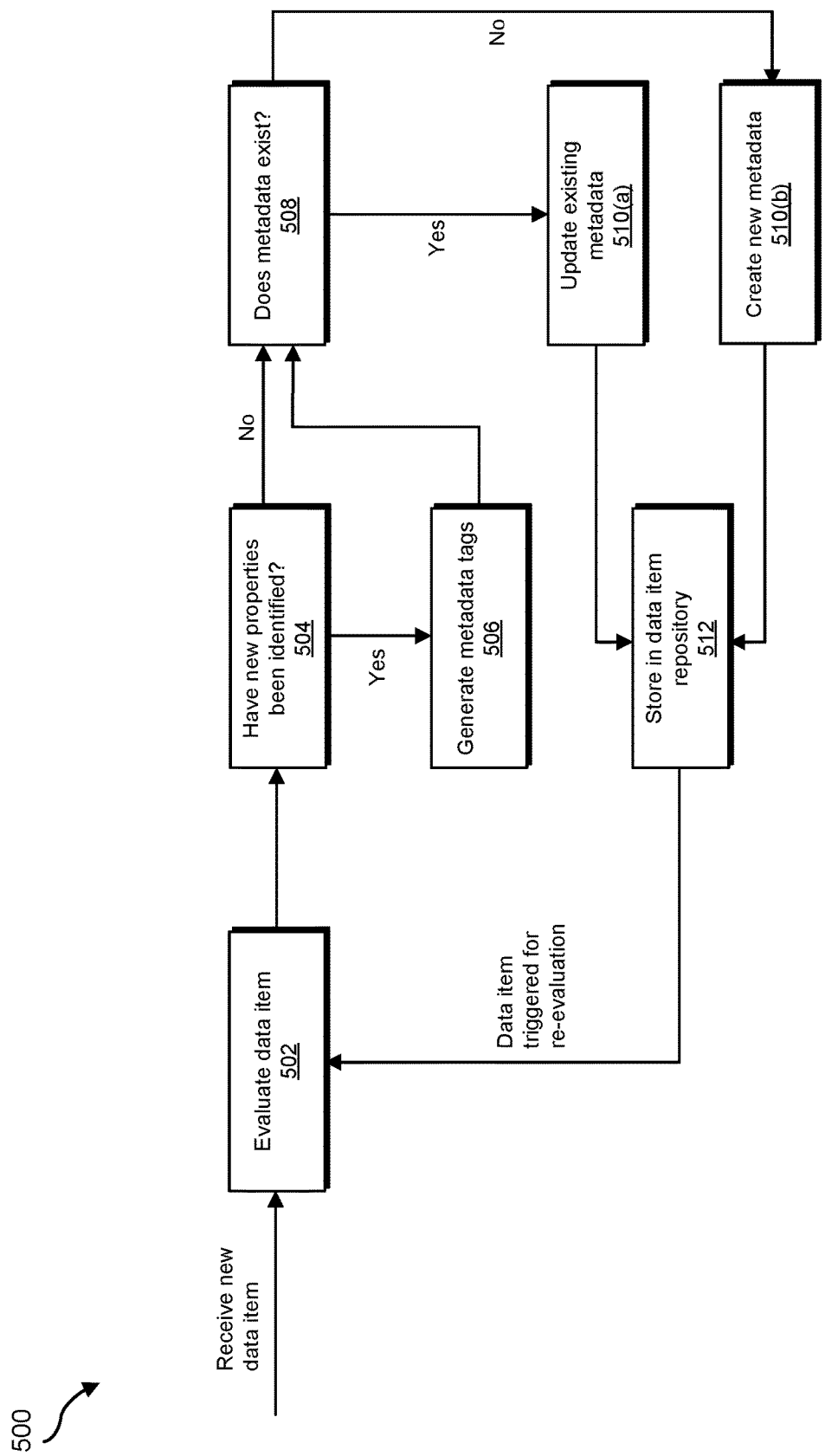
FIG. 5 is a flow diagram of an additional example method for evaluating and storing data items Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

FIG. 5 illustrates an example method for performing the data-evaluation and data-storage services described in connection with FIGS. 3 and 4. At step 502 in FIG. 5, a data item may be evaluated. As illustrated in FIG. 5, this data item may be a new data item that has not yet been evaluated or a previously-evaluated data item that was triggered for re-evaluation after being stored within a data item repository. At step 504, the results of the evaluation may be analyzed. In the event that the evaluation identified new properties of the data item (e.g., if the data item is a new data item or if new rules related to a previously-stored data item have been generated), the method may proceed to step 506. At step 506, metadata tags describing the newly-identified properties and rules used to determine the properties may be generated. The method may then proceed to step 508. At step 504, if the evaluation did not identify new properties of the data item (e.g., if no new rules related to a previously-stored data item have been generated), the method may proceed directly to step 508.

Step 508 may include determining whether metadata for the data item has been previously generated. In the event that metadata has been previously generated (e.g., the data item has been previously evaluated and stored), the method may proceed to step 510(*a*). At step 510(*a*), the existing metadata may be updated to reflect the latest evaluation of the data item. In the event that new metadata tags for the data item were generated (e.g., at step 506), this new metadata may be appended to the existing metadata. In the event that no new metadata tags were generated, a note or reference may be added to the existing metadata that indicates the data item was re-evaluated but no new properties were determined. At step 508, in the event that no metadata for the data item currently exists (e.g., the data item is a new data item), the method may proceed to step 510(*b*). At step 510(*b*), metadata tags generated at step 506 may be appended to the data item.

After step 510(*a*) or 510(*b*) has been performed, the method may proceed to step 512. At step 512, the data item, with the appended and/or updated metadata, may be stored in a data item repository. The data item may reside in the data item repository until it is triggered for re-evaluation, at which point the method may begin again at step 502.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating and storing data items, at least a portion of the method being performed by a computing device comprising at least one processor, the method comprising:
   receiving a data item to be evaluated and stored within a data item repository;
   evaluating the data item by comparing the data item with a set of rules used to determine properties of data items;
   appending, to a data structure that contains the data item and is separate from data structures that contain other data items stored within the data item repository, a metadata tag that indicates:
      at least one determined property of the data item; and
      contextual details about a state of at least one rule used to determine the property at a point in time at which the rule was used;
   storing, within the data item repository, the data item with the appended metadata tag; and
   after the data item has been stored, updating the set of rules used to determine properties of data items by:
      searching metadata tags within the data item repository to identify a number of data items that have been evaluated by the rule within a certain period of time; and
      determining whether to remove the rule from the set of rules based at least in part on whether the number of data items is below a threshold number.

2. The method of claim 1, wherein receiving the data item comprises receiving the data item at a data storage system from an endpoint device that requests the data item be evaluated and stored.

3. The method of claim 1, wherein receiving the data item comprises:
   identifying the data item within a repository of data items maintained by a data storage system;
   determining that the data item has previously been evaluated; and
   detecting a trigger that prompts the data item to be re-evaluated.

4. The method of claim 3, wherein the trigger comprises at least one of:
   a change in the rule used to determine the property of the data item; and
   a request from a user to re-evaluate the data item.

5. The method of claim 3, wherein appending the metadata tag to the data item comprises updating, within the metadata tag, an evaluation history of the data item that identifies additional contextual details about properties determined during the previous evaluation of the data item.

6. The method of claim 1, wherein the contextual details about the state of the rule comprise at least one of:
   an identification of the rule;
   a version of the rule; and
   the point in time at which the rule was used.

7. The method of claim 1, further comprising utilizing information within the metadata tag to identify changes in properties of the data item over time.

8. The method of claim 1, further comprising recording additional contextual details about the rule that indicate at least one of:
   a frequency with which the rule was used to evaluate data items;
   a point in time at which the rule was created; and
   a subsequent point in time at which the rule was modified.

9. The method of claim 1, wherein determining whether to remove the rule from the set of rules comprises determining to not remove the rule based on the number of data items not being below the threshold number.

10. The method of claim 1, wherein determining whether to remove the rule from the set of rules comprises determining to remove the rule based on the number of data items being below the threshold number.

11. The method of claim 10, wherein removing the rule from the set of rules comprises combining the rule with at least one additional rule within the set of rules.

12. A system for evaluating and storing data items, the system comprising:
   a reception module, stored in memory, that receives a data item to be evaluated and stored within a data item repository;
   an evaluation module, stored in memory, that evaluates the data item by comparing the data item with a set of rules used to determine properties of data items;
   a storing module, stored in memory, that:
      appends, to a data structure that contains the data item and is separate from data structures that contain other data items stored within the data item repository, a metadata tag that indicates:
         at least one determined property of the data item; and
         contextual details about a state of at least one rule used to determine the property at a point in time at which the rule was used; and
      stores, within the data item repository, the data item with the appended metadata tag;
   a performance module, stored in memory, that updates the set of rules used to determine properties of data items by:
      searching metadata tags within the data item repository to identify a number of data items that have been evaluated by the rule within a certain period of time; and
      determining whether to remove the rule from the set of rules based at least in part on whether the number of data items is below a threshold number; and
   at least one physical processor configured to execute the reception module, the evaluation module, the storing module, and the performance module.

13. The system of claim 12, wherein the reception module receives the data item at a data storage system from an endpoint device that requests the data item be evaluated and stored.

14. The system of claim 12, wherein the reception module receives the data items by:
   identifying the data item within a repository of data items maintained by a data storage system;
   determining that the data item has previously been evaluated; and
   detecting a trigger that prompts the data item to be re-evaluated.

15. The system of claim 14, wherein the trigger comprises at least one of:
   a change in the rule used to determine the property of the data item; and
   a request from a user to re-evaluate the data item.

16. The system of claim 14, wherein the storing module updates, within the metadata tag, an evaluation history of the data item that identifies additional contextual details about properties determined during the previous evaluation of the data item.

17. The system of claim 12, wherein the contextual details about the state of the rule comprise at least one of:
- an identification of the rule;
- a version of the rule; and
- the point in time at which the rule was used.

18. The system of claim 12, wherein the performance module further utilizes information within the metadata tag to identify changes in properties of the data item over time.

19. The system of claim 12, wherein the storing module further records additional contextual details about the rule that indicate at least one of:
- a frequency with which the rule was used to evaluate data items;
- a point in time at which the rule was created; and
- a subsequent point in time at which the rule was modified.

20. A non-transitory computer-readable medium comprising one or more computer-executable instructions that, when executed by at least one processor of a computing device, cause the computing device to:
- receive a data item to be evaluated and stored within a data item repository;
- evaluate the data item by comparing the data item with a set of rules used to determine properties of data items;
- append, to a data structure that contains the data item and is separate from data structures that contain other data items stored within the data item repository, a metadata tag that indicates:
  - at least one determined property of the data item; and
  - contextual details about a state of at least one rule used to determine the property at a point in time at which the rule was used;
- storing, within the data item repository, the data item with the appended metadata tag; and
- after the data item has been stored, updating the set of rules used to determine properties of data items by:
  - searching metadata tags within the data item repository to identify a number of data items that have been evaluated by the rule within a certain period of time; and
  - determining whether to remove the rule from the set of rules based at least in part on whether the number of data items is below a threshold number.

* * * * *